United States Patent

Stapf et al.

(10) Patent No.: US 6,230,768 B1
(45) Date of Patent: May 15, 2001

(54) AUTOMOTIVE FUEL FILLER PIPE VALVE

(75) Inventors: Uwe Stapf, Röttingen; Rainer Gramss, Würzburg, both of (DE)

(73) Assignee: Itw-Ateco G.m.b.H., Rottingen (DE)

( * ) Notice: Subject to any disclaimer, the term of this patent is extended or adjusted under 35 U.S.C. 154(b) by 0 days.

(21) Appl. No.: 09/539,901

(22) Filed: Mar. 31, 2000

(30) Foreign Application Priority Data

Apr. 3, 1999 (DE) .............................. 199 15 241

(51) Int. Cl.$^7$ .............................. B65B 1/04; B60K 15/04
(52) U.S. Cl. .................. 141/348; 141/301; 220/86.2; 220/DIG. 33
(58) Field of Search .................. 141/312, 346, 141/347, 348, 349, 301; 220/86.2, DIG. 33

(56) References Cited

U.S. PATENT DOCUMENTS 5,901,760 * 5/1999 Parker et al. ..................... 141/312
5,931,206 * 8/1999 Simdon et al. ..................... 141/312

* cited by examiner

Primary Examiner—Steven O. Douglas
(74) Attorney, Agent, or Firm—Lowe Hauptman Gilman & Berner, LLP

(57) ABSTRACT

An automotive fuel filler pipe valve assembly includes a valve receptacle adapted to be attached to an automotive body panel or receptacle at the body panel, the valve having a spherical or cylindrical inner space and a larger opening and a smaller second opening diametrically opposed to the larger opening, an annular seal seat being associated with the second opening, a spherical or cylindrical valve member which is fittingly accommodated by the inner space and pivotally supported about an axis to be moved between a closed and an opened position, the valve member having a funnel shaped through passage which in the opened position of the valve member interconnects the openings of the receptacle and in an angular offset position separates the openings, a closing member which is biased against the sealing seat by a spring and which may be opened by a filler pipe by a fuel-filling gun introduced through the passage, a locking member adapted to be moved between a locking and a releasing position and, when in its locking position, blocks the closing member in its closing position and releases it in its releasing position, a driving mechanism for the valve member, a transmission arrangement between the driving mechanism and the valve member which moves the locking member into its locking position if the driving mechanism pivots the valve member into the closed position, and a connection housing between the valve receptacle and a connection for a tank pipe and which accommodates the closing member and the locking member.

7 Claims, 3 Drawing Sheets

AUTOMOTIVE FUEL FILLER PIPE VALVE

TECHNICAL FIELD

The invention relates to an automotive fuel filler pipe valve assembly.

BACKGROUND ART

It is known to guide a pipe coming from a tank of an automobile to a receptacle at a body panel which, in turn, is adapted to be inserted in an opening of the body panel. The receptacle may be moulded from plastic material and may contain valves for allowing fuel overflow or venting of excess gas pressure in the tank. In such a structure, the opening in the automotive body is adapted to be closed by an appropriate lid. The lid may be lockable with the locked position being releasable from inside the vehicle. For example, automatic unlocking may be effected when the vehicle is stopped, but is not key-locked yet. The lid may also be locked by means of a central locking mechanism.

It has also been proposed to provide a valve, which is alternately opened or closed, in the automotive body between the tank pipe and the opening. When closed, the valve blocks the connection between the pipe and the automotive body opening, whereas, when open it releases a through passage between the opening and the pipe, through which a fuel gun may be introduced. Such a construction has the advantage that a lid is no longer required on the automotive body. The lid is susceptible of being torn off readily and also is an obstacle in automatic filling. In the case described, the valve member is constituted by a sphere having a passage with the sphere being pivotally supported about an axis, for example, through 90° in order to interconnect the openings in the opened position and to block them from each other in the closed position. A sphere also helps in obtaining sufficient sealing against dust and splashwater. The valve receptacle in which the sphere is supported may be made of plastic material and may be breakably attached to the automotive body so that the valve receptacle may be released in an accident and fuel prevented from exiting.

It is an object of the invention to create an automotive fuel filler pipe valve assembly which enables an automatic opening and closing of the tank filler pipe, which is automatically locked in the closed position.

SUMMARY OF THE INVENTION

The inventive automotive fuel filler pipe valve uses a spherical or cylindrical valve member including a through passage which alternately interconnects two openings in the housing or separates them from each other. The one opening, which is the larger one, faces the opening of the automotive body panel, whereas the smaller opening is connected to the pipe leading to the tank. Associated with the smaller opening is a seal seat which, in turn, interacts with a closing member biased against the seal seat by a spring. In the opened condition of the valve member, the fuel gun may be passed through the passage of the valve member and may be moved against the locking member, which then will open and allow filling.

In addition, the inventive valve provides a locking member which is adapted to be moved between a locking and a releasing position and, when in its locking position, blocks the closing member in its closed position and releases it in its releasing position. The valve member is actuated by means of a drive. A transmission is provided between the drive or valve member and the locking member such that the locking member is moved into its locking position when the drive pivots the valve member into the closed position. The drive may be effected in the easiest way by a linkage. As an alternative, actuation by a force may be provided, which acts on the valve member via transmission means.

When the valve member is in the closed position the closing member will automatically be closed so that no fuel can exit from the tank pipe.

Finally, a connection housing is provided between the valve receptacle and a connection for the tank pipe, which accommodates the closing member and the locking member. The junction between the valve receptacle and the connection has to be made tight since the fuel is filled into the tank pipe through the connection housing.

Various constructional aspects are possible in configuring the closing member. One aspect of the invention provides that the closing member include a pivotally supported flap which interacts with the free end of a filler pipe defining the second opening.

Another aspect of the invention provides that the drive be an electric motor which is coupled to a drive pin of the valve member via a belt transmission or other transmission means.

As mentioned earlier, the locking member is also actuated by the drive. This may be accomplished, according to another aspect of the invention, by coupling the electric motor, via a worm gear, to a rod which is rotatable about its axis and has a lateral locking extension which constitutes the locking member, and which is pivoted in the locking position via the closing member, e.g. the flap. According to a further aspect of the invention, two parallel spaced, pivotable rods may be provided, which have a locking extension each.

BRIEF DESCRIPTION OF THE DRAWING

The invention will now be described in detail with reference to one embodiment shown in the drawing.

BEST MODE FOR CARRYING OUT THE INVENTION

In FIGS. 1 to 6, a spherical receptacle 10 has a circular opening 12 and is mounted in an appropriate receptacle at the body panel, which is not shown. Opening 12 is aligned towards an opening in the automotive body (not shown either).

Shown on the housing side diametrically opposed to opening 12 is a filler pipe 14 (e.g. FIG. 2) which defines a smaller opening 16.

Figure 5:
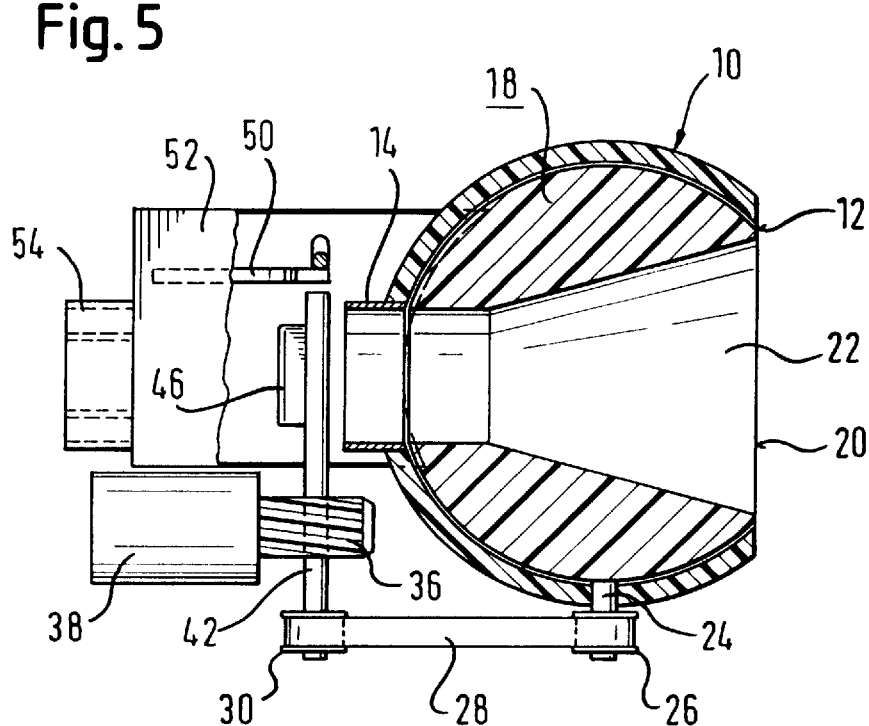
FIG. 5 is a section through the valve of FIGS. 1 to 3 with the closing member opened.
Figure 6:
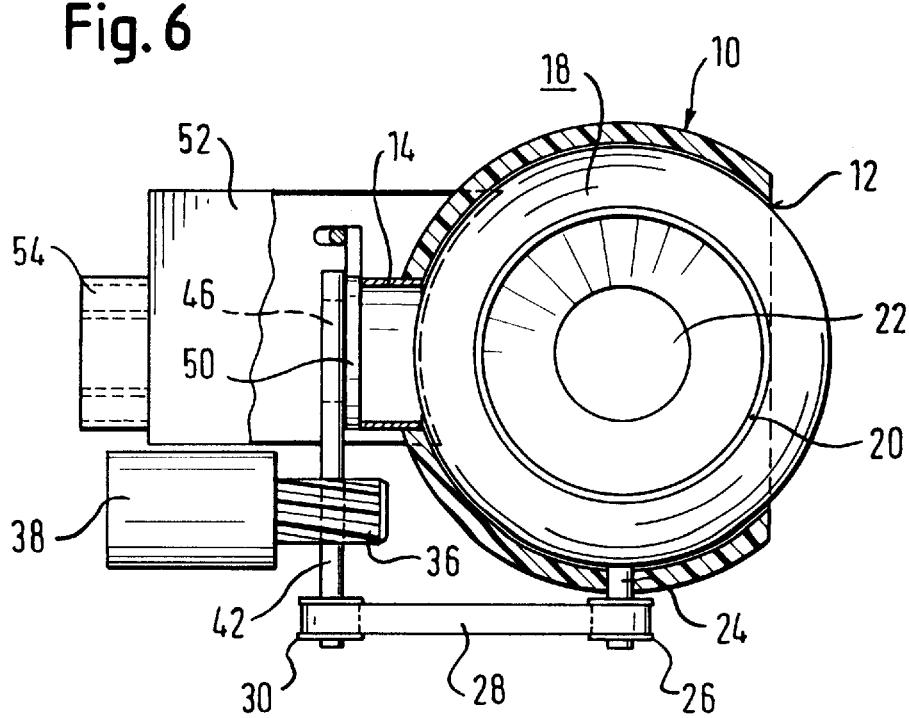
FIG. 6 is a representation similar to FIG. 5, but with the valve member closed and the closing member closed.

As is evident from FIGS. 5 and 6, the inner space of housing 10 is also spherical and is nearly fittingly accommodates a valve member 18 of a spherical shape which, however, has a flattened area 20. Valve member 18 has a funnel-like through passage 22 which in the opened position shown in FIG. 5 connects opening 12 to filler pipe 14. In the opened position, the flattened area 20 is flush with opening 1.2 of housing 10.

Valve member 18 is adapted to be pivoted about an axis lying in the drawing plane which, when pivoted through approximately 90°, causes it to take the position shown in FIG. 6 in which opening 12 is separated from filler pipe 14. At this point, a portion of the sphere projects outwardly beyond housing opening 12. Hence, valve member 18 provides for dust and splash-water sealing when in the closed position.

Housing 10 and spherical valve member 18 may be moulded from plastic material. In order that sphere 18 may be inserted into housing 10 the housing 10 may be formed by two parts, which parts are finally interconnected around the sphere.

Spherical valve member 18 is equipped with a drive pin 24 which is rotatably supported in housing 10. Seated at its outer surface is a driving wheel 26 which is in a driving connection with a driving wheel 30 via a belt 28.

As is evident from FIGS. 1 through 4, driving wheel 30 is seated on a shaft 32 on which a gearwheel 34 is also seated. Gearwheel 34 is in operative communication with a helical gear 36 which is driven by an electric motor 38. Thus, gearwheels 34, 36 form a transmission. Another gearwheel 40 also forms a transmission with gearwheel 36. Connected to gearwheels 34, 36 are rods 42 and 44, respectively (particularly see FIG. 2), which extend at a distance from and in parallel with each other. Locking extensions 46, 48 are laterally connected to the rods.

A flap 50 is pivotally supported about an axis. It is biased by a spring (not shown) to a position in which it interacts with the free end of filler pipe 16 to sealingly close it. The closed position can be seen in FIG. 4.

Figure 1:
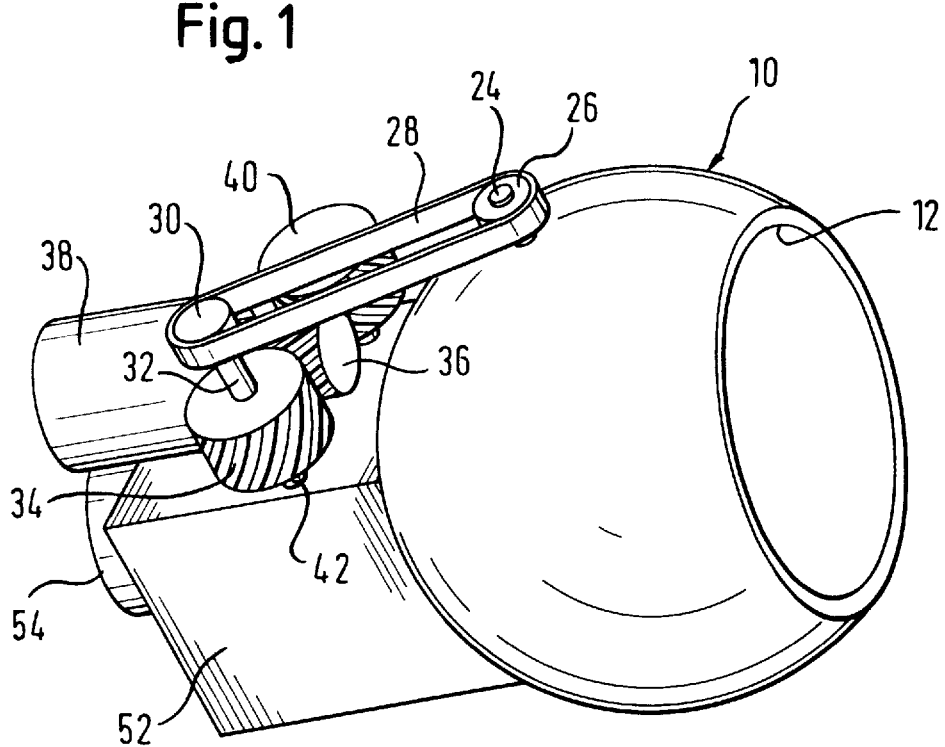
FIG. 1 is a schematic perspective view of an automotive fuel filler pipe valve according to the invention.
Figure 2:
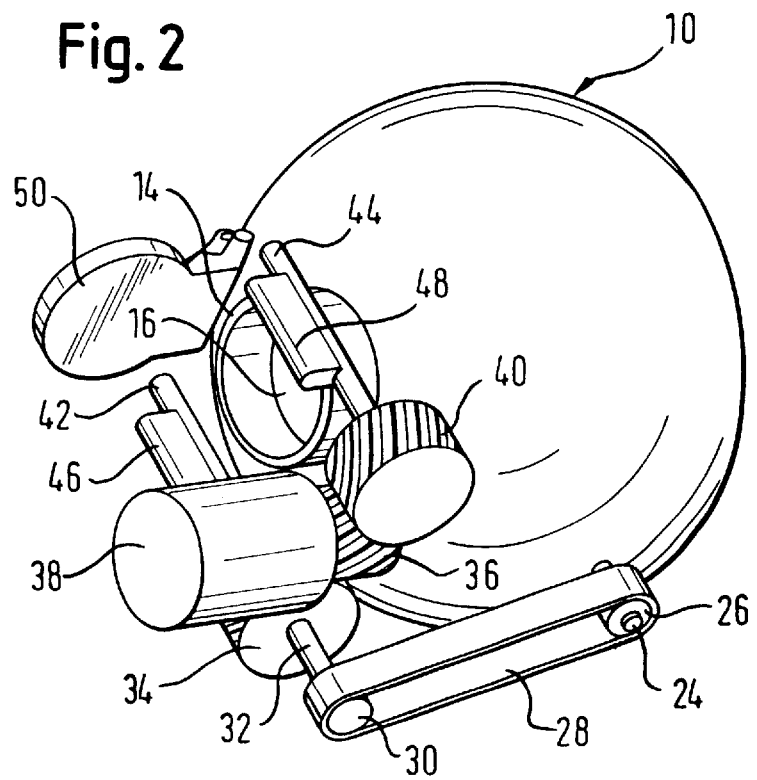
FIG. 2 is another view of the automotive fuel filler pipe valve of FIG. 1, also in a perspective representation, without a connection housing.
Figure 3:
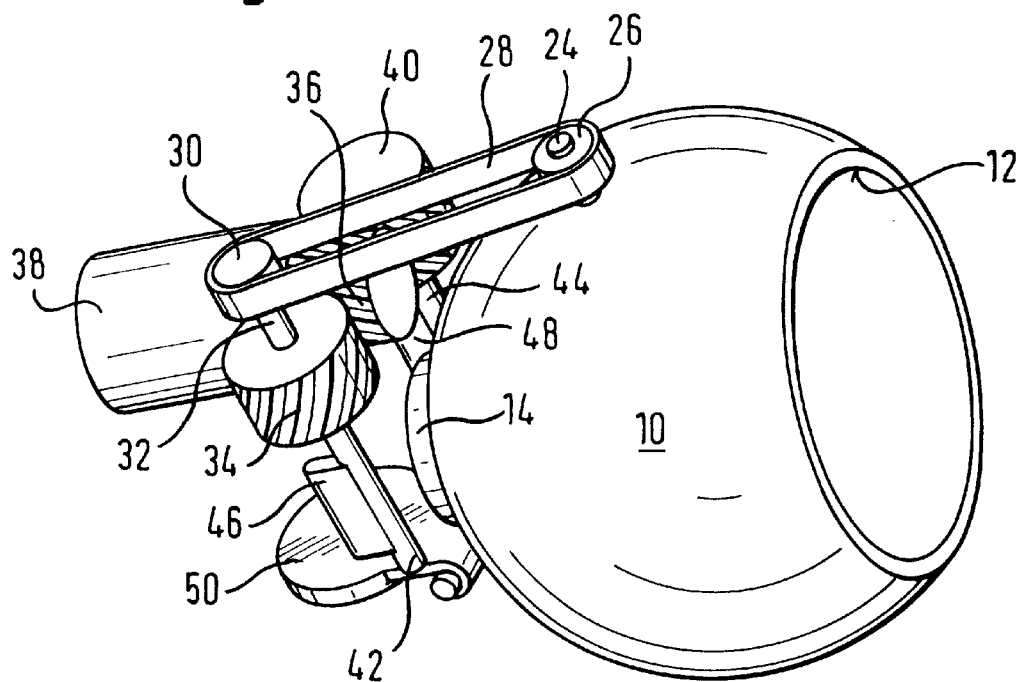
FIG. 3 is a representation similar to FIG. 1, with the connection housing omitted.
Figure 4:
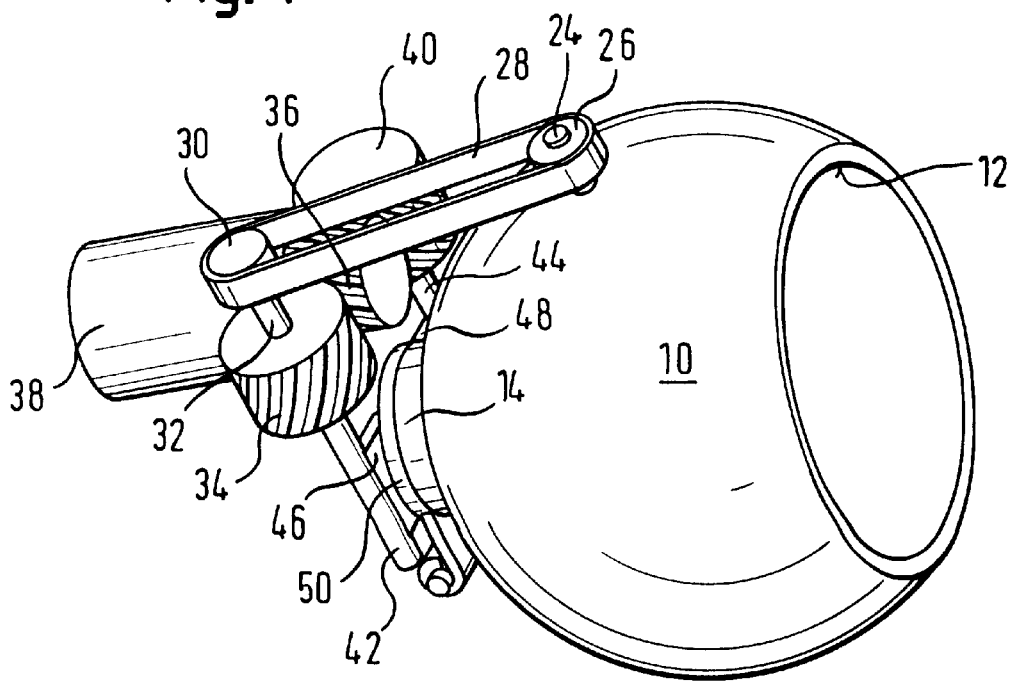
FIG. 4 is a representation similar to FIG. 3, but with the closing member closed.

What is ensured via the transmission shown is that when valve member 18 is in an opened position as shown in FIG. 5 locking extensions 46, 48 are pivoted, by means of rods 42, 44, to a position in which the flap may take the closed position of FIG. 4 and that a fuel gun may be swivelled on by means of an extension guided through passage 42 in order that liquid fuel may be filled into the tank. When valve member 18 is in the closed position of FIG. 6 locking extensions 46, 48 are pivoted through approximately 90° and rest on the outer surface of flap 50 or have approached it to a large extent so that flap 50 cannot be opened. This automatically locks the closing flap mechanically and affords closure required in case of an accident.

Housing 10 has tightly disposed on it a connection housing 52 which has a connection 54 on the side opposed to valve receptacle 10 for being joined to a tank pipe (not shown either). As can be seen from FIG. 1 closing flap 50 as well as rods 42, 44 including locking extensions 46, 48 are disposed inside housing 52. Rods 42, 44 are sealingly passed through the wall of connection housing 52. The housing is adapted to firmly be connected to the automotive body in an appropriate way and, in turn, to support the electric motor and the gear transmission described. It may support flap 50 in its inner space.

What is claimed is:

1. An automotive fuel filler pipe valve assembly, comprising a valve receptacle (10) adapted to be attached to one of an automotive body panel and receptacle at the body panel, the valve receptacle having an inner space and a larger opening (12) and a smaller second opening (16) diametrically opposed to the larger opening (12), an annular seal seat being associated with the second opening, a valve member (18) disposed within the inner space and pivotally supported about an axis for movement between a closed and an opened position, the valve member having a funnel shaped through passage (22) which in the opened position of the valve member (18) interconnects the openings of the receptacle (10) and in an angular offset position closes the openings, a closing member (50) which is biased against the seal seat with a spring and which is adapted to be opened by a filler pipe by a fuel-filling gun introduced through the passage, a locking member (46, 48) adapted to be moved between a locking position and a releasing position and wherein, in its locking position, said locking member blocks the closing member in its closing position and releases it in its releasing position, a driving mechanism (38) mounted to move the valve member (18) about said axis between the closed and opened position, a transmission arrangement (36,34,40) between the driving mechanism (38) and the valve member (18) which moves the locking member (46,48) into its locking position if the driving mechanism (38) pivots the valve member (18) into the closed position and a connecting housing (52) between the valve receptacle (10) and a connection (54) for a tank pipe and which accommodates the closing member (50) and the locking member (46, 48).

2. The assembly of claim 1, wherein the closing member (50) is a pivotally supported flap which cooperates with the free end of the filler pipe (14) which forms the second opening (16).

3. The assembly of claim 1, wherein the driving mechanism (38) includes an electric motor which through a belt drive (28) is coupled with a drive pin (24) of the valve member (18).

4. The assembly of claim 1, wherein the driving mechanism (38) includes an electrical motor and the electrical motor is coupled with a rod (42,44) through a worm gear, the rod being adapted to rotate about an axis and having a lateral locking extension (46, 48) which forms the locking member and which in the locking position is pivoted in an overlapping position with respect to the closing member (50).

5. The assembly of claim 4, wherein two parallel spaced rods (42, 44) are provided each rotatable about an axis and each having a locking extension (46, 48).

6. The assembly of claim 1, wherein said valve receptacle has a spherical inner space.

7. The assembly of claim 1, wherein said valve receptacle has a cylindrical inner space.

* * * * *